(12) United States Patent
Smith et al.

(10) Patent No.: US 7,439,702 B2
(45) Date of Patent: Oct. 21, 2008

(54) APPLICATION OF A SWITCHED RELUCTANCE MOTION CONTROL SYSTEM IN A CHILLER SYSTEM

(75) Inventors: Stephen Harold Smith, York, PA (US); Harold Robert Schnetzka, York, PA (US); Ivan Jadric, York, PA (US)

(73) Assignee: York International Corporation, York, PA (US)

( * ) Notice: Subject to any disclaimer, the term of this patent is extended or adjusted under 35 U.S.C. 154(b) by 248 days.

(21) Appl. No.: 11/273,991

(22) Filed: Nov. 15, 2005

(65) Prior Publication Data

US 2007/0108934 A1   May 17, 2007

(51) Int. Cl.
*H02P 1/46* (2006.01)
*H02P 3/18* (2006.01)
*H02P 6/00* (2006.01)
*H02P 23/00* (2006.01)
*H02P 25/00* (2006.01)
*H02P 27/00* (2006.01)

(52) U.S. Cl. .................................................. 318/701
(58) Field of Classification Search .................. 318/701
See application file for complete search history.

(56) References Cited

U.S. PATENT DOCUMENTS

| | | | |
|---|---|---|---|
| 3,618,337 A | 11/1971 | Mount | |
| 3,876,326 A | 4/1975 | Weitz | |
| 4,670,696 A | 6/1987 | Byrne et al. | |
| 4,731,570 A | 3/1988 | Lee | |
| 5,010,267 A | 4/1991 | Lipo et al. | |
| 5,174,130 A | 12/1992 | Lucas | |
| 5,246,349 A | 9/1993 | Hartog | |
| 5,335,507 A | 8/1994 | Powell | |
| 5,423,192 A | 6/1995 | Young et al. | |
| 5,440,218 A | 8/1995 | Oldenkamp | |
| 5,947,854 A | 9/1999 | Kopko | |

(Continued)

FOREIGN PATENT DOCUMENTS

| | | |
|---|---|---|
| AT | 372777 | 11/1983 |
| DE | 3044898 A1 | 7/1982 |
| DE | 3200739 A1 | 7/1983 |
| EP | 0933603 A1 | 8/1999 |
| EP | 0607012 A2 | 3/2008 |

(Continued)

OTHER PUBLICATIONS

James E. Vrancik, Prediction of Windage Power Loss in Alternators, NASA Technical Note NASA TN D-4849, National Aeronautics and Space Administration, Washington, D.C., Oct. 1968, pp. 1-18.

*Primary Examiner*—Lincoln Donovan
*Assistant Examiner*—Erick Glass
(74) *Attorney, Agent, or Firm*—McNees Wallace & Nurick, LLC (57) ABSTRACT

A chiller system includes a switched reluctance motor for powering the compressor of the chiller system. A variable speed drive with a boost converter provides a boosted voltage to the switched reluctance motor. The switched reluctance motor and the compressor may be disposed within the same hermetic enclosure and driven by a common drive shaft. Cooling for both the variable speed drive and the switched reluctance motor is provided from condenser water in the condenser water circuit, or from an intermediate liquid cooled by water from the condenser circuit to increase system efficiency. Windage losses are reduced by barriers introduced within the motor, and by maintaining a reduced pressure in the switched reluctance motor.

20 Claims, 8 Drawing Sheets

U.S. PATENT DOCUMENTS

| | | | |
|---|---|---|---|
| 6,193,473 B1 * | 2/2001 | Mruk et al. | 417/350 |
| 6,481,652 B2 | 11/2002 | Strutz et al. | |
| 7,003,971 B2 * | 2/2006 | Kester et al. | 62/259.2 |
| 7,181,928 B2 * | 2/2007 | de Larminat | 62/505 |
| 2003/0094007 A1 | 5/2003 | Choi et al. | |
| 2003/0192338 A1 | 10/2003 | Manohar et al. | |
| 2005/0223720 A1 | 10/2005 | Miller et al. | |

FOREIGN PATENT DOCUMENTS

| | | |
|---|---|---|
| FR | 8016494 | 7/1980 |
| JP | 01200095 A | 8/1989 |
| JP | 2001186797 | 7/2001 |
| WO | WO 93/18356 | 9/1993 |
| WO | WO 97/24791 A1 | 7/1997 |
| WO | WO 02/101244 A1 | 12/2002 |

* cited by examiner

APPLICATION OF A SWITCHED RELUCTANCE MOTION CONTROL SYSTEM IN A CHILLER SYSTEM

BACKGROUND OF THE INVENTION

The present invention relates generally to the method of applying a switched reluctance motor in a chiller system. More specifically, the present invention relates to a chiller system including a high-frequency switched reluctance variable speed drive for a switched reluctance motor that power a compressor of the chiller system.

In the past, the induction motors for driving compressors in chiller systems were designed to operate from standard line (main) voltages and frequencies that were available from the power distribution system of the facility where the motor was being operated. The use of line voltages and frequencies typically required the compressors to use some inefficient mechanical means (such as inlet guide vanes for centrifugal compressors and a slide valve for screw compressors) for modulating capacity as a result of the motor being limited to one operating speed that was based on the input frequency to the motor. In addition, if the operating speed of the motor was not equal to the desired operating speed of the compressor, a "step up," or "step down," gearbox was inserted between the motor and the compressor to obtain the desired operating speed of the compressor. Furthermore, motors that required their own controller or electronic drive, e.g., switched reluctance motors, could not be used for these chiller systems, as such motors could not operate directly from standard (main) voltages and frequencies.

Next, variable speed drives (VSDs) were developed that could vary the frequency and/or voltage that was provided to the induction motors of a chiller system. This capability to vary the input frequency and voltage to the motor resulted in an induction motor that was capable of providing a variable output speed and power to the corresponding compressor of the chiller system. The variable speed operation of the motors (and compressors) enabled the chiller system to take advantage of efficiencies that occur during partial loading of the compressors, when operation at a speed lower than full load design speed is desirable. The use of the variable speed drive also permitted the use of other types of motors that required their own electronic drive, e.g., switched reluctance motors, in chiller systems in addition to the previous motors that were capable of operating directly from a three-phase power line, e.g., induction motors or synchronous motors.

One limitation of prior induction motor style VSDs is that the magnitude of the output voltage from the VSD can be no larger than the magnitude of the input, or utility, line voltage to the VSD. This limit on the output voltage occurs because the rectifier of the VSD only provides a DC voltage that is at a magnitude equal to approximately 1.3 times the root mean square (rms) value of the line-to-line AC voltage supplied to the VSD. This limitation on the output voltage of the variable speed drive limits the maximum speed of the conventional induction motor to a speed that corresponds to the speed of the motor operated at line voltage (because of the constant volts/hertz ratio required by a conventional induction motor). To obtain greater compressor speeds, a "step up" gearing arrangement has to be incorporated between the motor and the compressor to increase the output rotational speed of the motor driving the compressor. Alternately, one could use a lower rated voltage motor and operate the motor at higher than its rated voltage and frequency to obtain higher maximum rotational speed, provided the motor was physically capable of such high-speed operation. In this regard, the switched reluctance motor has a distinct advantage over the induction motor because the switched reluctance motor is able to operate at higher rotational speeds due to the physical simplicity of the motor rotor construction.

In addition, this limitation on the output voltage from the VSD limits the operating speed range of high-speed motors, including high-speed switched reluctance motors, in the chiller system. The high speed motors, used to obtain faster compressor speeds without the "step up" gearing arrangement, are limited because it is more difficult to design an efficient and cost-effective motor when only a limited voltage range is available. High speed switched reluctance motors are desirable in a chiller system because they are capable of higher efficiency, improved reliability, and lower cost, than other types of motors. In addition, the physical simplicity of the rotor construction of the switch reluctance motor lends itself to a higher degree of mechanical robustness, providing for ease of use in high speed applications.

Another limitation of prior switched reluctance machines, because of their high-speed operation, is the loss of efficiency due to windage. Motors operating at high speeds generate significant heat due to salient pole construction of the motor, and aerodynamic friction loss caused by rotation of the motor rotor. Air cooling of the motor is typically utilized to maintain the motor temperature within an acceptable ambient operating range. However, air flowing through the motor generates turbulence, or windage, resulting in additional motor losses. The losses due to windage diminish the overall improvement in efficiency that is a desirable characteristic of switched reluctance motors. The windage losses can be reduced, but they cannot be eliminated.

Therefore, what is needed is a switched reluctance motor for a compressor of a chiller system, with supplemental cooling to increase the operating efficiency of the chiller system.

What is also needed is a variable speed drive for a high speed switched reluctance motor that can provide a cost-effective, efficient and easily implemented operation of the high speed switched reluctance motor in a chiller system.

SUMMARY OF THE INVENTION

The present invention is directed to a system of applying a switched reluctance motor in a chiller system. In a preferred embodiment, a chiller system includes a switched reluctance motor, a compressor, a condenser and an evaporator connected in a closed refrigerant loop. The switched reluctance motor is connected to the compressor to power the compressor. The switched reluctance motor includes a rotor portion and a stator portion. The rotor portion and stator portion define an air gap between the rotor portion and the stator portion. The rotor portion includes a first end and a second end. A variable speed drive is electrically connected to the switched reluctance motor. The variable speed drive has a heat exchanger portion, and is configured to receive an input AC power at a fixed input AC voltage and a fixed input frequency and to provide an output power at a variable voltage and variable frequency to the switched reluctance motor. A motor cooling means is attached to the switched reluctance motor stator portion. A pair of barrier portions is disposed at the rotor first and second ends to restrict turbulent fluid flow through the air gap of the switched reluctance motor. There is also provided a hermetic housing in which the switched reluctance motor and the compressor are disposed. A drive shaft interconnects the compressor and the switched reluctance motor. The motor cooling means includes a jacket portion with at least one conduit for fluid flow therethrough disposed on the switched reluctance motor stator portion. The jacket portion is connected with and in fluid communication with a condenser fluid circuit for circulating condenser fluid through the jacket portion for cooling the switched reluctance motor.

In another embodiment, the present invention is directed to a chiller system having a switched reluctance motor, a compressor, a condenser and an evaporator connected in a closed refrigerant loop. The compressor is disposed within an hermetic housing and has a shaft connected to a coupling means, for coupling the compressor shaft to the switched reluctance motor to power the compressor. The switched reluctance motor includes a rotor portion and a stator portion defining an air gap between the rotor portion and the stator portion and the rotor portion including a first end and a second end. A variable speed drive is electrically connected to the switched reluctance motor, the variable speed drive having a heat exchanger portion, and configured to receive an input AC power at a fixed input AC voltage and a fixed input frequency and provide an output power at a variable voltage and variable frequency to the switched reluctance motor. A motor cooling means is attached to the switched reluctance motor. A pair of barrier portions is disposed at the rotor first and second ends for restricting turbulent fluid flow through the air gap of the switched reluctance motor. The cooling means includes a jacket portion having at least one conduit for fluid flow therethrough disposed on the switched reluctance motor stator portion, and the jacket portion being connected and in fluid communication with a condenser fluid circuit for circulating condenser fluid through the jacket portion for cooling the switched reluctance motor. The system may also include a conduit interconnecting a suction chamber of the compressor to the air gap for reducing the air pressure in the motor relative to atmospheric pressure.

Alternately, the cooling means may include a conduit interconnecting the liquid side of the refrigerant loop of the chiller system with the motor, and an expansion valve in the conduit, for vaporizing the liquid refrigerant from the refrigerant loop and for providing the vaporized refrigerant in the air gap of the switched reluctance motor.

One advantage of the present invention is improved overall system efficiency through lower operating temperatures in the motor and VSD, from the use of condenser water to cool the components.

Another advantage of the present invention is increased system efficiency and potential cost reduction by eliminating gears between the motor and the compressor.

A further advantage of the present invention is improved reliability of the chiller system due to the robust design of the switched reluctance motor.

Still another advantage of the present invention is improved system efficiency realized through reduced windage and friction losses in the motor.

A further advantage of the present invention is a higher maximum operating speed and a faster dynamic response of the motor.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
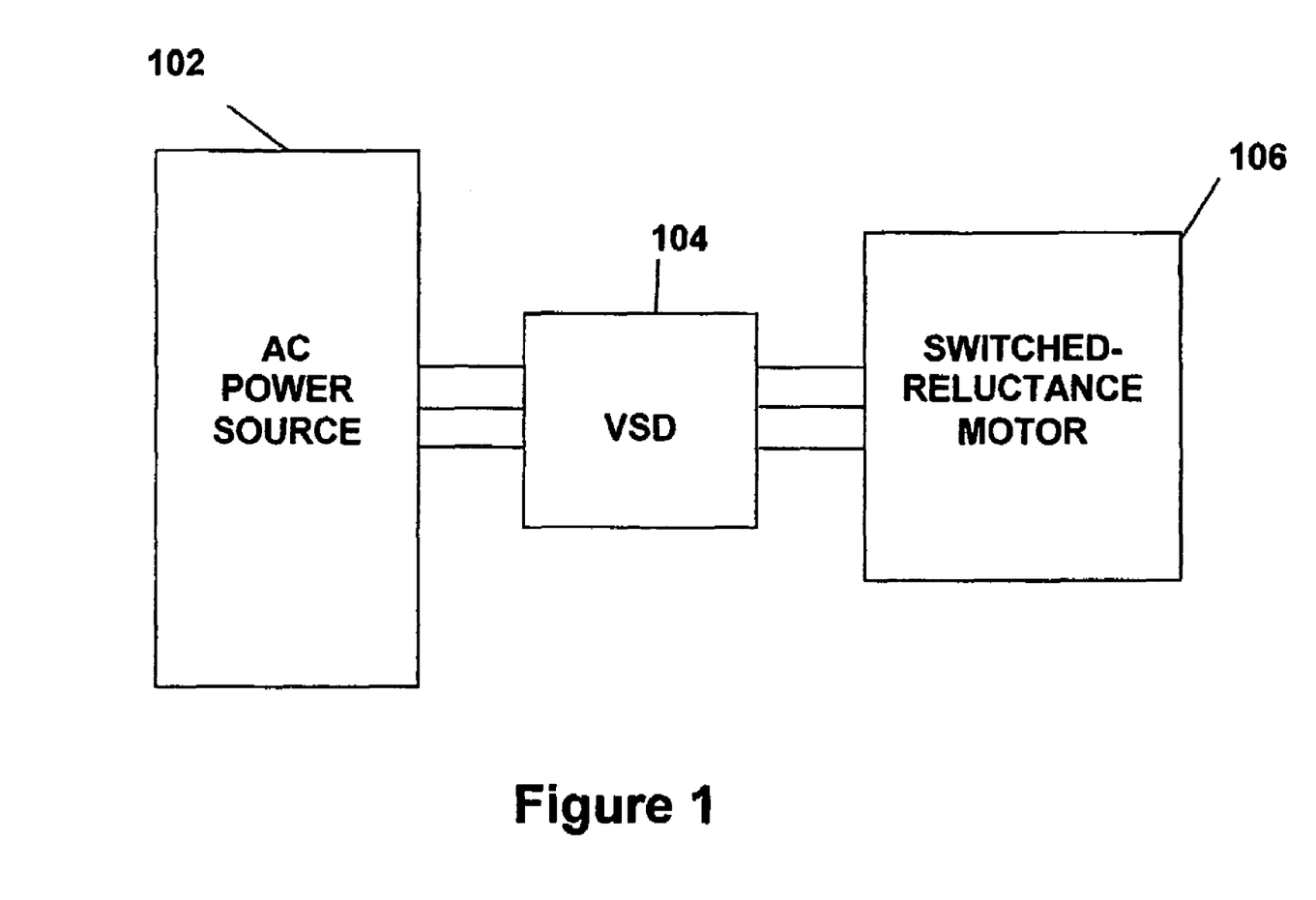
FIG. 1 illustrates schematically a general system configuration of the present invention.

FIG. 1 illustrates generally a system configuration of the present invention. An AC power source 102 supplies a variable speed drive (VSD) 104, which powers a switched reluctance (SR) motor 106. In another embodiment of the present invention, the variable speed drive 104 can power more than one switched reluctance motor 106. The SR motor 106 is preferably used to drive a corresponding compressor of a refrigeration or chiller system (see generally, FIG. 3). The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V, at a line frequency of 50 Hz or 60 Hz, to the VSD 104 depending on the corresponding AC power grid.

The VSD 104 receives AC power having a particular fixed line voltage and fixed line frequency from the AC power source 102 and provides power to the SR motor 106 at a desired voltage and desired frequency, both of which can be varied to satisfy particular requirements. Power is delivered to the SR motor 106 in the form of voltage and current pulses. Voltage pulses consist of a positive voltage being applied to the SR motor's windings, and may also include a portion of negative voltage being applied to the SR motor's windings. Current pulses include only positive current flowing through the SR motor's windings. The exact shape of voltage and current pulses is dependent upon the kind of inverter being used for the SR motor 106, and how such inverter is controlled. The frequency of current and voltage pulses is generally proportional to the speed at which the SR motor 106 rotates, but its exact value depends on the number of stator phases and rotor poles inside the SR motor 106.

Figure 2:
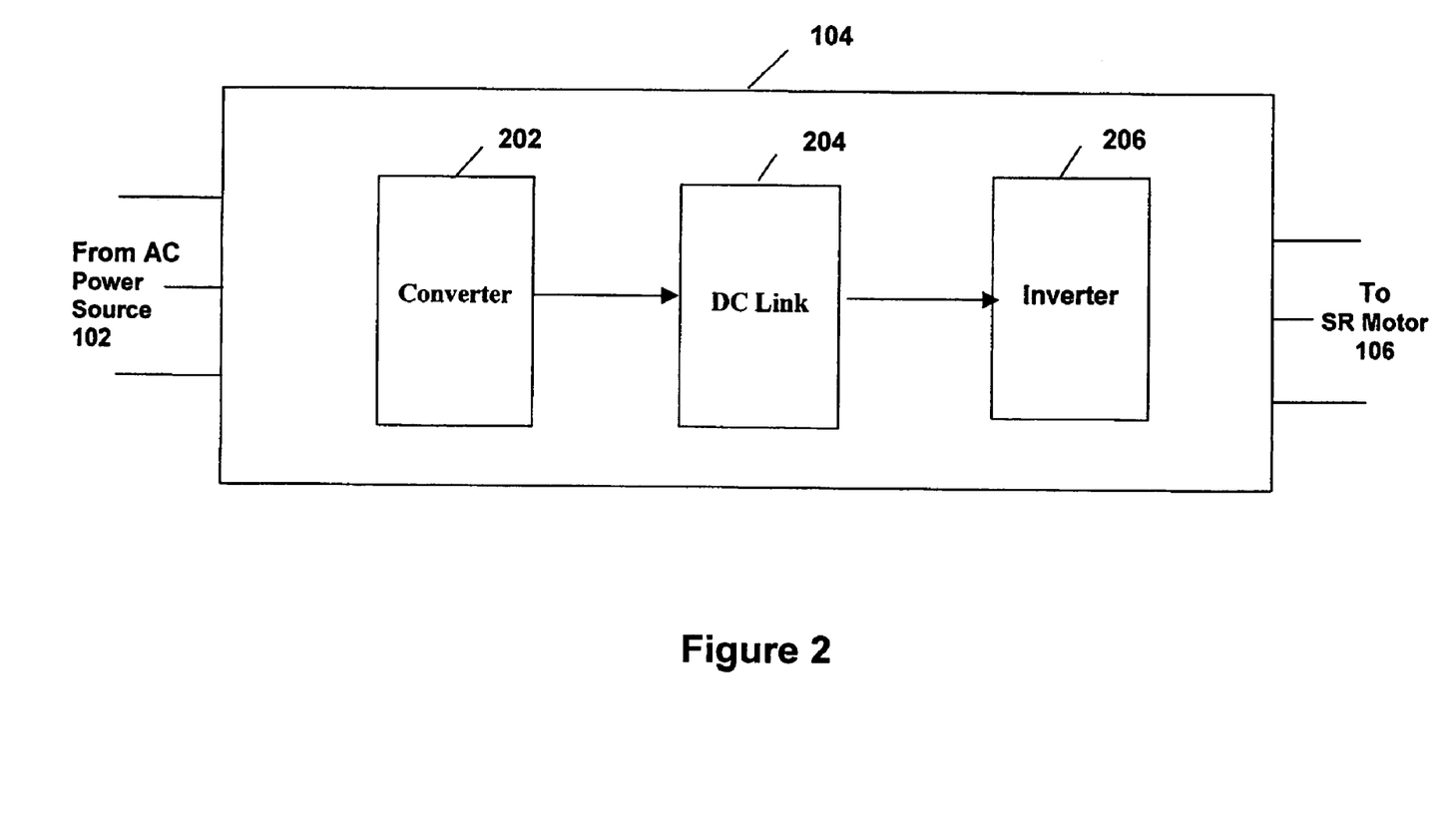
FIG. 2 illustrates schematically an embodiment of variable speed drive of the present invention.

FIG. 2 illustrates one embodiment of the VSD 104 of the present invention. The VSD 104 can have three stages: a converter stage 202, a DC link stage 204 and an output stage having an inverter(s) 206. The converter 202 converts the fixed line frequency, fixed line voltage AC power from the AC power source 102 into DC power. The DC link 204 filters the DC power from the converter 202 and provides energy storage components. The DC link 204 can be composed of capacitors and inductors, which are passive devices that exhibit high reliability rates and very low failure rates. The inverter 206 converts the DC power from the DC link 204 into variable frequency, variable voltage power for the SR motor 106. The inverter 206 can be a power module that can include power transistors, insulated gate bipolar transistor (IGBT)

power switches and inverse diodes. Furthermore, it is to be understood that the DC link 204 and the inverter(s) 206 of the VSD 104 can incorporate different components from those discussed above so long as the DC link 204 and inverter(s) 206 of the VSD 104 can provide the SR motor 106 with appropriate output voltage waveforms.

Figure 3:
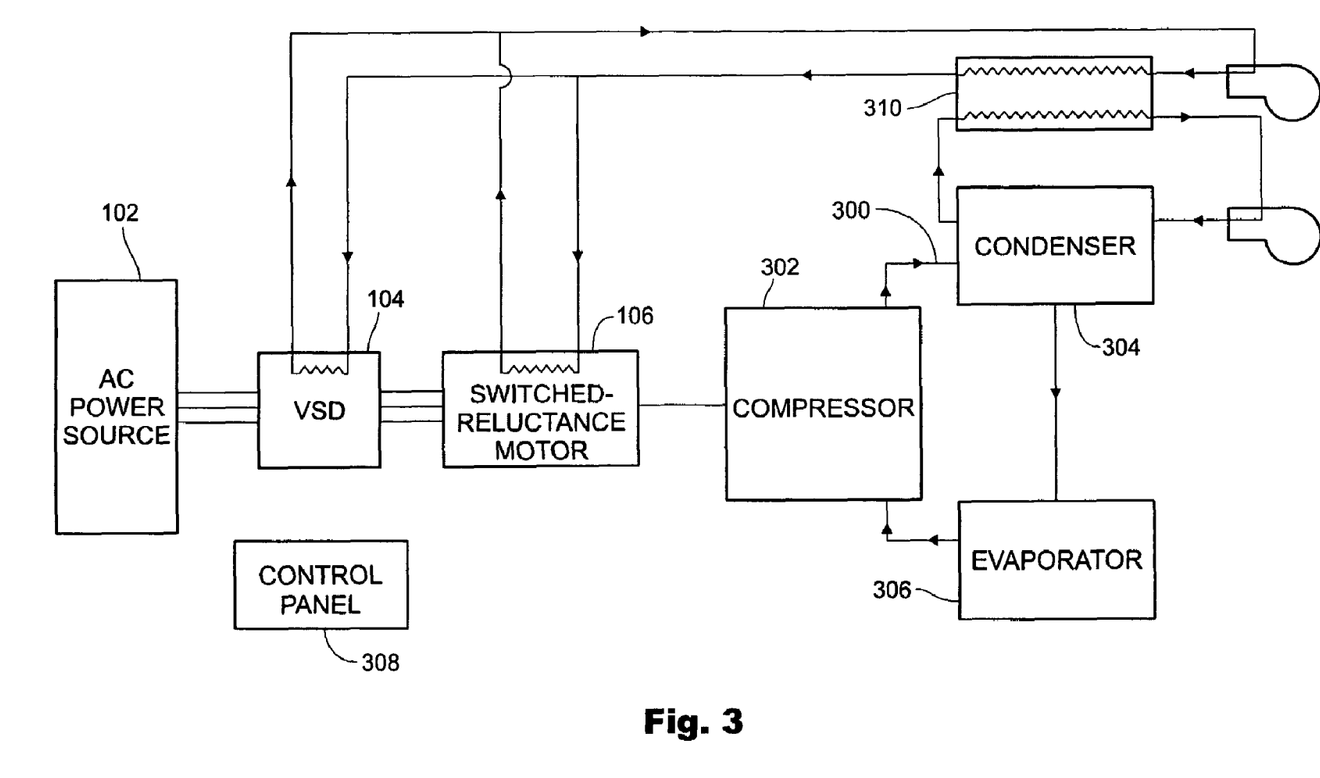
FIG. 3 illustrates schematically a refrigeration system that can be used with the present invention.

As shown in FIG. 3, the HVAC, refrigeration or liquid chiller system 300 includes a compressor 302, a condenser arrangement 304, a liquid chiller or evaporator arrangement 306 and the control panel 308. The compressor 302 is driven by the SR motor 106 that is powered by VSD 104. The VSD 104 receives AC power having a particular fixed line voltage and fixed line frequency from AC power source 102 and provides power to the SR motor 106 at desired voltages and desired frequencies, both of which can be varied to satisfy particular requirements. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104, as well as other components of the chiller system 300.

The SR motor 106 used in the system 300 can be any suitable type of high efficiency switched reluctance motor. In addition, the SR motor 106 should have a relatively flat efficiency vs. load curve due to the absence of any magnetizing current, which may be present in other types of motors. The relatively flat efficiency vs. load curve indicates that the efficiency of the SR motor 106 does not change significantly with changes in the load. Furthermore, each stator phase in the SR motor 106 is independent of the other stator phases in the SR motor 106. The independent stator phases in the SR motor 106 enable the SR motor 106 to continue to operate at a reduced power if one of the stator phases should fail, thus increasing the reliability of the chiller system.

Referring back to FIG. 3, compressor 302 compresses a refrigerant vapor and delivers the vapor to the condenser 304 through a discharge line. The compressor 302 is preferably a centrifugal compressor. However, it is to be understood that the compressor 302 can be any suitable type of compressor, e.g., screw compressor, reciprocating compressor, scroll compressor, etc. The refrigerant vapor delivered by the compressor 302 to the condenser 304 enters into a heat exchange relationship with a fluid, and undergoes a phase change to a refrigerant liquid as a result of the heat exchange relationship with the fluid. Preferably, the fluid used in the present invention is water. There may also be a secondary heat exchanger 310 provided, including an intermediate liquid that is in a heat exchange relationship with the condenser water. The condensed liquid refrigerant from condenser 304 flows through an expansion device (not shown) to the evaporator 306.

The evaporator 306 includes connections for a supply line and a return line of a cooling load. A secondary liquid, e.g. water, ethylene, calcium chloride brine or sodium chloride brine, travels into the evaporator 306 via the return line and exits the evaporator 306 via the supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of evaporator 306 can be used in the system 300, provided that the appropriate phase change of the refrigerant in the evaporator 306 is obtained.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD or multiple VSDs connected into each of one or more refrigerant circuits.

Referring back to FIG. 2, the converter 202 can be a diode or thyristor rectifier coupled to a PWM boost DC/DC converter to provide a boosted DC voltage to the DC link 204 in order to obtain an output voltage from the VSD 104 greater than the input voltage of the VSD 104. In another example, the converter 202 can be a pulse width modulated boost rectifier having insulated gate bipolar transistors (IGBTs) to provide a boosted DC voltage to the DC link 204 to obtain an output voltage from the VSD 104 greater than the input voltage of the VSD 104. The VSD 104 can provide output voltage pulses at such frequencies, which result in the motor speed being at least two times greater than the speed of an induction motor operating directly from the 50 Hz or 60 Hz utility line. The boosted DC Link 204 provides for both a higher maximum operating frequency, better dynamic response, and lower motor and drive losses than in the conventional motor drive for an SR motor. To be able to more efficiently use the boosted voltage from the VSD 104, the SR motor 106 preferably has a voltage rating that is greater than the fixed line voltage from the AC power source 102. However, the SR motor 106 can also have a voltage rating that is equal to or less than the fixed line voltage from the AC power source 102.

In addition to providing a boosted DC voltage to the DC link 204, the converter 202 can control the shape and phase angle of the current waveform that is drawn from the AC power source 102 to improve the input power quality of the VSD 104. Furthermore, the converter 202 can be used to improve the ride-through capabilities of the VSD 104 during a decrease of the AC input voltage, also referred to as a voltage sag.

Figure 4:
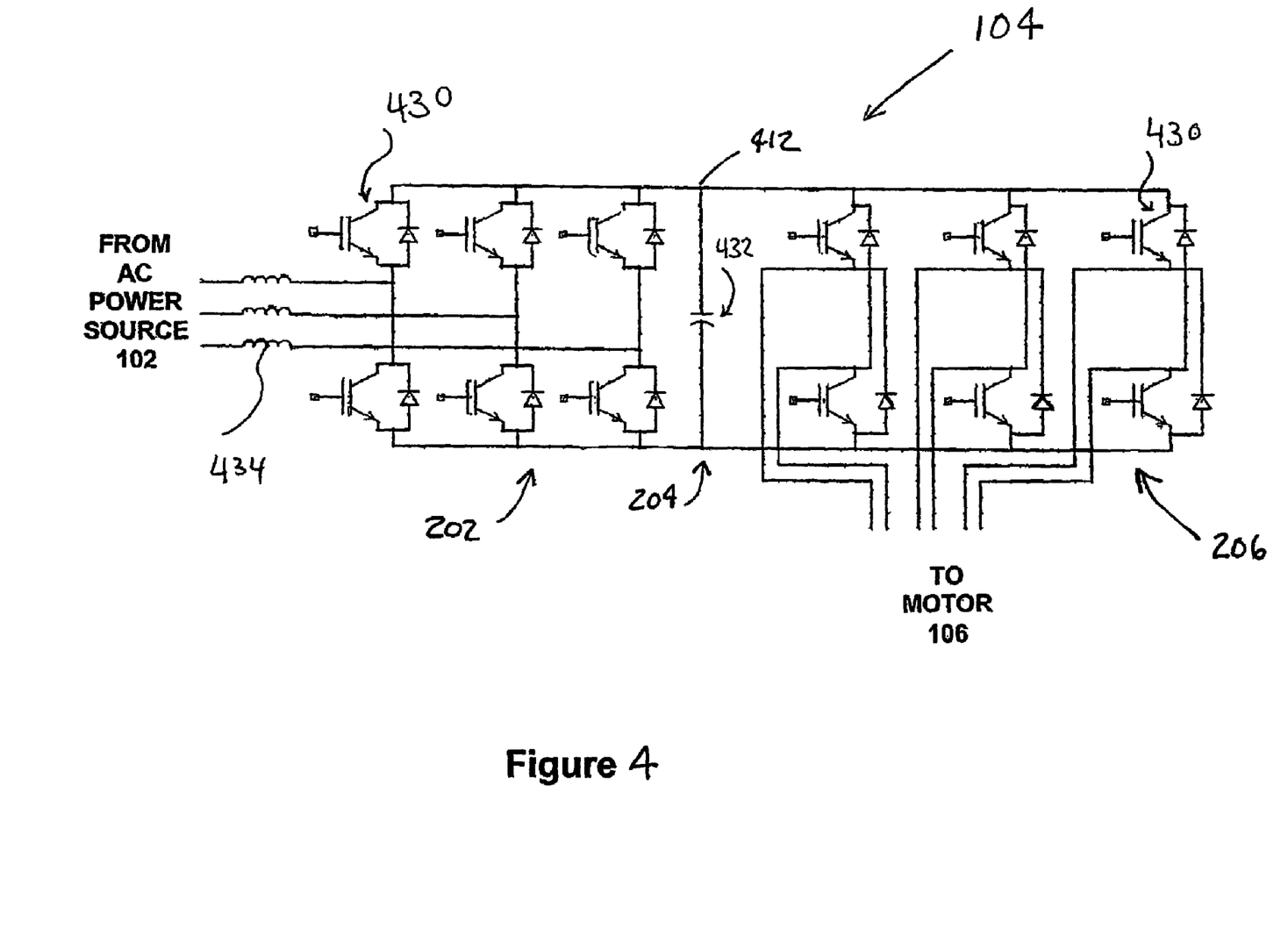
FIG. 4 illustrates a circuit diagram of one embodiment of the variable speed drive of the present invention.

FIG. 4 shows a circuit diagram for one embodiment of the VSD 104. In this embodiment of the VSD 104, the input lines from a three-phase AC power source 102 are connected to inductors 434 that are used to smooth the current in the corresponding line of the VSD 104. The output of each of the inductors 434 is then provided to the converter 202 to convert each phase of the input AC power to DC power. In addition, the VSD 104 can include additional components located upstream of the inductors 434 that are not shown in FIG. 4. For example, a circuit breaker can be included, which circuit breaker can disconnect the VSD 104 from the AC power source 102 when an excess current, voltage or power is provided to the VSD 104. The circuit breaker can be connected to an optional autotransformer. The autotransformer, when used, is preferably used to adjust an input voltage (either up or down) from the AC power source 102 to a desired input voltage. Finally, fuses for each line can be used to disconnect that input phase or line of the VSD 104 in response to an excessive current in that line.

The VSD 104 can also include a precharge system (not shown) that can control the rise of the DC link voltage from 0 V to the rated voltage to avoid a large inrush current that can be damaging to the components of the VSD 104. The precharge system can include a precharge contactor that is used to connect precharge resistors between the input AC power source 102 and the converter 202 or, sometimes, between the input AC power source 102 and the DC link 204. These precharge resistors limit the inrush current to a manageable level. After the precharge is completed, the precharge resistors are excluded from the circuit by opening the precharge contactor, and the input AC power source 102 is connected directly to the converter 202 by closing another contactor, referred to as the supply contactor. The supply contactor remains closed during the operation of the system.

The converter module 202 includes three pairs (one pair for each input phase) of power switches or transistors 430. The converter module 202 also includes the corresponding control connections (not shown for simplicity) to control the switching of the power switches 430. In a preferred embodiment of the converter module 202, the power switches are IGBT power switches that are controlled by a pulse width modulation technique to generate the desired output voltages for the DC link. Preferably, the converter module 202 can operate as a boost rectifier to provide a boosted DC voltage, i.e., a voltage greater than the peak value of the input AC voltage, to the DC link 204 to obtain an output voltage from the VSD 104 greater than the input voltage of the VSD 104.

Connected in parallel to the outputs of the converter 202 is the DC link 204. The DC link 204 in this embodiment includes capacitor(s) 432 and resistors (not shown) to filter the DC power and store energy from a DC bus 412. The resistors can function as voltage balancing devices to maintain a substantially equal DC link voltage between capacitor banks. The resistors can also function as charge depleting devices to "bleed off" stored voltage in the capacitor banks when the power is removed from the AC power source 102. Also connected to the DC bus 412 is an inverter section 206, which converts the DC power on the DC bus 412 to the power for the SR motor 106. In the embodiment shown in FIG. 4, one three-phase inverter section or module 206 is used to drive a three-phase SR motor. However, different numbers of phases are possible within each inverter module, depending on the number of phases in the SR motor. Also, additional inverter modules 206 can be added (to drive additional SR motors) and would have a similar circuit representation to the inverter module 206 shown in FIG. 4.

One embodiment of the inverter module 206 includes three pairs (one for each output phase) of insulated gate bipolar transistor (IGBT) power switches 430 and diodes. Each stator phase winding for the SR motor 106 is connected between an upper and a lower IGBT power switch in one inverter leg. The diodes in the same inverter leg assure that the positive current established in an SR motor's winding has a path to flow when IGBT switch(es) are turned off. The series connection of the two IGBT switches in each leg of the inverter 206 with a phase winding of the SR motor 106 prevents the occurrence of an inverter shoot through, which is a situation where both IGBT power switches 430 in the pair of IGBT power switches are conductive at the same time and connected directly across the DC link, thus resulting in an excessive current in the inverter 206. The inverter modules 206 also include the corresponding control connections (not shown for simplicity) to control the switching of the IGBT power switches 430. As it is known in the art of SR motors, there exist other possible embodiments of the inverter for an SR motor, where switches and diodes differ in number and are connected in manner different from the one described above, which could be used in the place of inverter 206 shown in FIG. 4.

The inverter module 206 converts the DC power on the DC bus 412 to the power required by the SR motor by selectively switching each of the IGBT power switches 430 in the inverter module 206 between an "on" or activated position and an "off" or deactivated position using a modulation scheme to obtain the desired voltage pulses at a desired frequency from the inverter module 206. A gating signal or switching signal is provided to the IGBT power switches 430 by the control panel 308, based on the modulation scheme, to switch the IGBT power switches 430 between the "on" position and the "off" position. The IGBT power switches 430 are preferably in the "on" position when the switching signal is "High," i.e., a logical one, and in the "off" position when the switching signal is "Low," i.e., a logical zero. However, it is to be understood that the activation and deactivation of the IGBT power switches 430 can be based on the opposite state of the switching signal.

One aspect of the control of the SR motor 106 involves the establishment of current in the stator phase windings of the SR motor 106 as soon as possible after the issuance of a control signal at a given point in time. However, the stator phase winding of the SR motor 106 operates similar to an inductor, i.e., it opposes the rise of current in the stator phase winding, while the current is being established in the stator phase winding. The ability of the VSD 104, and specifically the inverter 206, to provide a boosted voltage to the SR motor 106 results in the ability to operate the motor at a higher maximum speed and provides for a better dynamic response of the SR motor 106 when compared to a motor that does not receive a boosted voltage. The application of the boosted voltage to the SR motor 106 results in the current rising and falling more rapidly in the stator phase winding (the rate of rise of current is proportional to the magnitude of the voltage pulse being applied) and, thus, in the quicker establishment and extinction of a motoring torque developed between a stator winding and a rotor pole inside the SR motor. This results in a higher maximum operating speed and improved and quicker control, i.e., better dynamic response (e.g. faster acceleration/deceleration), of the SR motor 106.

By providing a boosted output voltage to the SR motor 106 with the inverter 206, the magnitude of the RMS value of motor current is reduced, which motor current is approximately inversely proportional to the output voltage for a given motor power rating. This reduction in motor current results in a reduction of motor losses for the SR motor 106, which motor losses are approximately proportional to the square of the magnitude of the motor current. The reduction of motor losses in the SR motor 106 results in increased efficiency for the chiller system 300.

Similarly, by providing a boosted DC voltage to the DC link 204 with the converter 202, the magnitude of the DC current into the inverter 206 is reduced, which inverter current is approximately inversely proportional to the DC input voltage of the inverter 206 for a given system power rating. This reduction in inverter current results in a reduction of inverter losses for the VSD 104. The reduction of inverter losses in the VSD 104 results in increased efficiency for the chiller system 300.

The ability of the VSD 104 to boost the DC link voltage independently of the line voltage permits the VSD 104 to be operated on a variety of foreign and domestic power grids without having to alter the SR motor 106 for different power sources.

Figure 5:
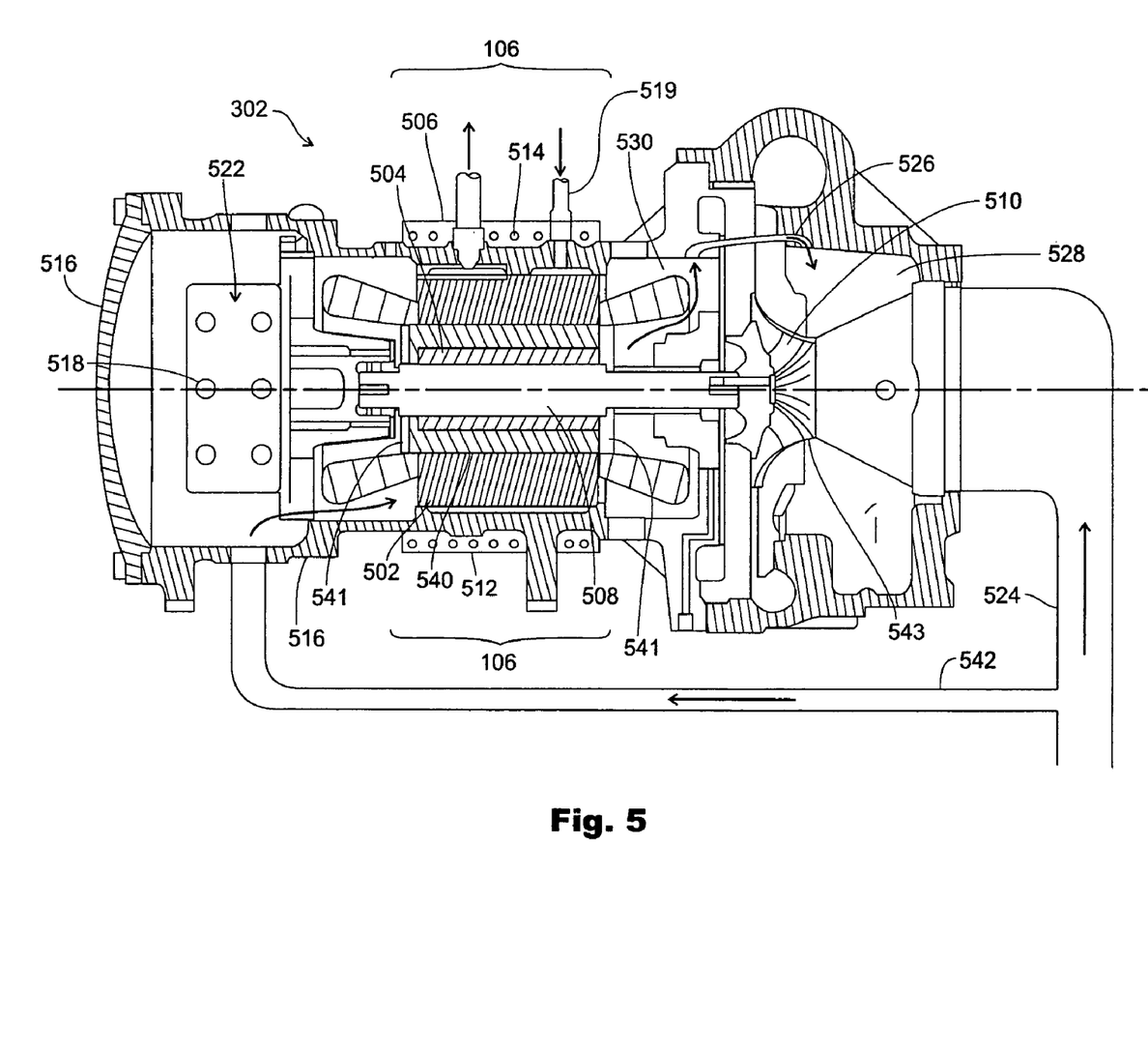
FIG. 5 illustrates a cross-sectional view of one embodiment of the switched reluctance motor/single-stage compressor arrangement.

Referring next to FIG. 5, preferably the SR motor 106 may utilize supplementary water cooling using the condenser water from the chiller system 300. The supplementary cooling system uses a jacket 512 that can be either disposed on an exterior surface or cast into the motor housing. The supplementary cooling system may also use a secondary heat exchanger 310 (see, generally, FIG. 3). Heat exchanger 310 includes an intermediate liquid that is in a heat exchange relationship with the condenser water. In the preferred embodiment, the VSD 104 would also include water as the intermediate liquid—i.e., a water-to-water jacket—to isolate the condenser cooling water circuit from the VSD cooling circuit and the motor cooling system. The separation of the two cooling circuits from the condenser via secondary heat exchanger 310 provides pressure isolation and a clean, dedicated cooling medium for the VSD 104, the SR motor 106, or for both.

In the preferred embodiment, the VSD 104 is disposed within an enclosure that is mounted directly on the motor 106, directly on motor housing boss 522 containing motor input terminals so that the power wiring connections may be made between the VSD output terminals and the motor input terminals locally, thereby eliminating any need for power conduits and wiring. The physical proximity of the VSD 104 to the motor 106 minimizes voltage drop due to power wiring, eliminates reflected voltage wave phenomena associated with VSDs having long cable lengths, and provides a more compact system. The control panel 308 is also preferably mounted adjacent the VSD 104, either on the condenser 304 or on the evaporator shell 306, to further minimize the space required for the chiller system 300.

Figure 6:
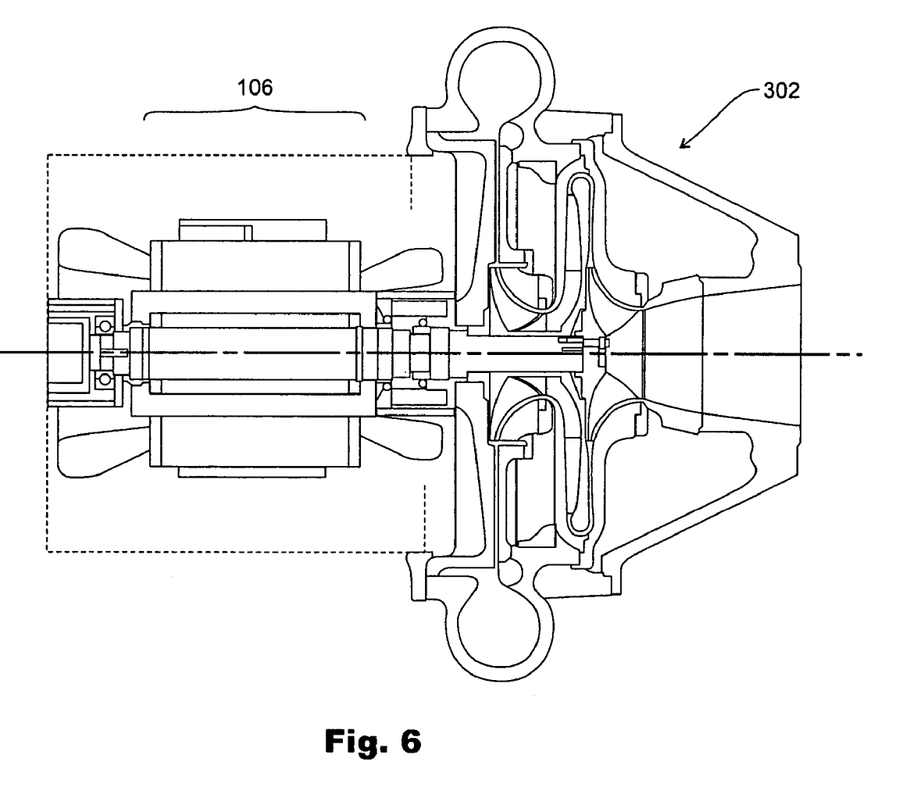
FIG. 6 illustrates a cross-sectional view of one embodiment of the switched reluctance motor/two-stage compressor arrangement.
Figure 7:
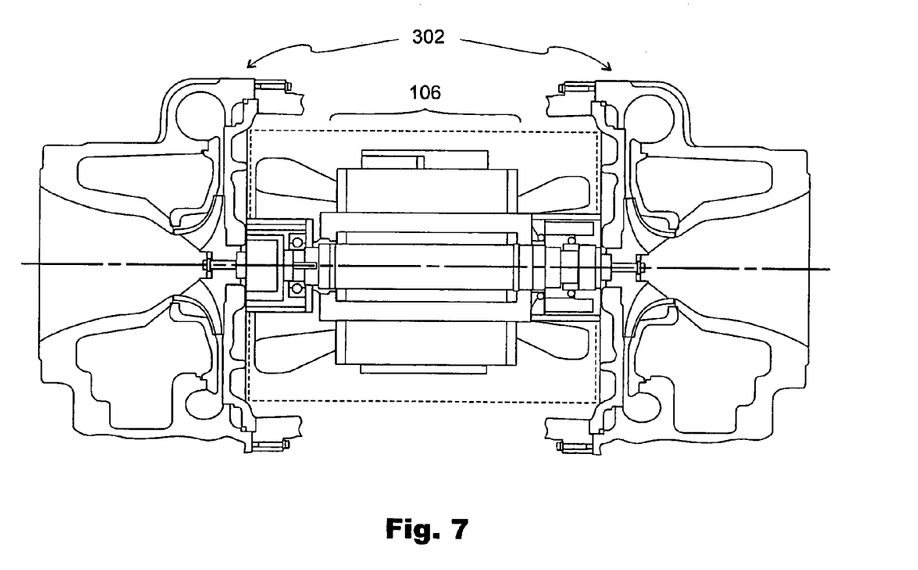
FIG. 7 illustrates a cross-sectional view of another of the switched reluctance motor/two-stage compressor arrangement.

An exemplary single-stage compressor 302 is powered by a switched reluctance motor 106. The compressor 302 may also be a two-stage compressor configured on a common shaft with the SR motor 106 such as in FIG. 6, or with the SR motor 106 disposed between the two stages, such as in FIG. 7. Referring again to the single-stage embodiment in FIG. 5, the SR motor 106 comprises a stator 502 having a plurality of projecting poles, and a rotor 504 also having a plurality of poles 506. In the cross-sectional drawing there are shown only one pair of poles for each of the stator 502 and the rotor 504, although the SR motor 106 normally has multiple pole-pairs on each of the stator 502 and the rotor 504, the stator 502 typically has a greater number of poles than the rotor 504. The rotor 504 is attached to a shaft 508 that is connected to and drives the impeller 510. A plurality of electrical connectors 518 connects the poles of the stator 502 to impart rotation to the rotor 504 and the impeller 510.

Improved chiller system efficiency may be realized by employing the motor cooling system to reduce stator losses in the SR motor 106. Since most of the losses in the SR motor 106 occur in the stator 502, by transferring heat generated in the stator 502 to the liquid in the water jacket 512, very little stator heat loss is introduced into the refrigerant circuit from the stator 502. Thus, the overall chiller efficiency is increased. A jacket portion 512 having either passages cast into the motor housing or passages attached to the exterior of the stator 502 to absorb heat generated in the windings of the stator 502. In FIG. 5, the SR motor 106 is shown within the hermetic enclosure 516 that encloses the compressor 302 and its associated components. However, in another possible embodiment the SR motor 106 is configured such that the motor 106 is entirely outside the hermetic enclosure 516.

Figure 8:
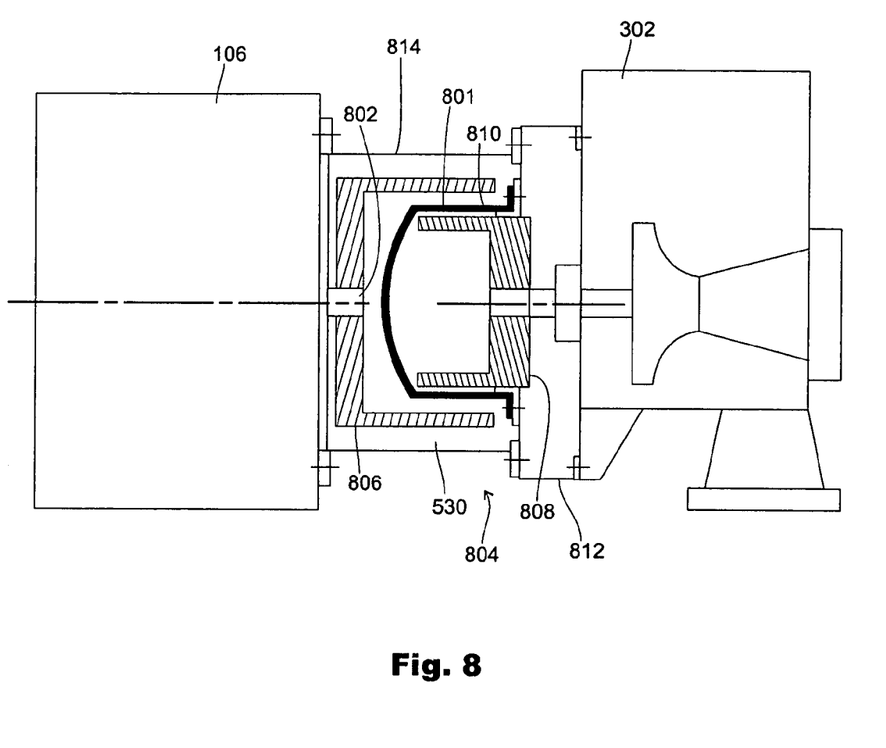
FIG. 8 illustrates a cross-sectional view of one embodiment of an air-cooled switched reluctance motor directly driving a compressor via a magnetic coupling.

In the other possible embodiment shown schematically in FIG. 8, the SR motor 106 is coupled to the shaft of the compressor 302 via a magnetic coupling 804. The motor shaft 802 ends in a motor hub portion 806 of the magnetic coupling 804, and is separated from the compressor by a hermetic enclosure barrier 801 that is integrally connected to a compressor hub portion 808 of the coupling 804. A motor adapter portion 814 is connected to a compressor adapter portion 812, the adapter portions 812, 814 together forming an enclosure around the coupling 804.

The air-cooled motor 106 in the embodiment shown in FIG. 8 can also use supplementary cooling by expelling motor heat to the condenser water. This is accomplished per the configuration shown in FIG. 5, where the jacket portion 512 is attached to the exterior of the stator 502. The jacket portion 512 includes conduits 514 arranged in a continuous path for flow of fluid. The jacket portion 512 transfers heat from the stator 502 to the fluid, which absorbs heat as it passes therethrough. It should be noted that conduits for fluid may be incorporated within the stator 502 itself, or may be used in combination with an external jacket portion 512. The jacket portion 512 is in fluid communication with a supply line 519, through which fluid is supplied to the jacket portion 512. Preferably, the fluid is an intermediate liquid that is cooled via direct heat exchange with condenser water, although condenser water may be circulated directly into the jacket portion 512 for direct cooling of the stator 502.

In an alternative embodiment of the invention, liquid refrigerant or refrigerant vapor from the chiller system 300 may also be employed to cool the motor 106. In that case, the refrigerant is expanded through an expansion valve (not shown) into the motor cavity and the resulting refrigerant gas flows through the passages of the motor and circulated around the gaps between the rotor 504 and the stator 502. While the use of chiller system refrigerant boosts the efficiency of the motor by reducing losses in the stator 502, a reduction in chiller system efficiency is realized due to the additional cooling load connected to the system 300. Thus, the preferred method uses the condenser water or an intermediate liquid cooled by the condenser water, to provide cooling liquid to the motor 106.

Barrier plates 541 are installed at either end of the motor rotor 504 to restrict air or refrigerant gas from entering passages within the motor rotor 541. The barrier plates 541 work in conjunction with a sleeve 540 on the rotor outside diameter to reduce air or gas turbulence inside the motor 106, thus reducing windage losses.

Optionally, the motor 106 may be maintained at a pressure lower than the suction refrigerant pressure, in the suction line 524 connecting the compressor 302 to the evaporator 306, to further reduce windage losses. The motor 106 is enclosed from the atmospheric pressure and in fluid communication with the suction line 524 via a conduit 542 and to the compressor chamber 528 via conduit 526 (shown schematically in FIG. 5). The compressor chamber 528 is maintained at a pressure lower than suction pressure due to the venturi effect of the gas entering the eye of the impeller 543. The conduit 526 is in fluid communication with motor passages 530 that exist between the rotor 504 and the stator 502. The gas inside of the motor—e.g. refrigerant vapor—is drawn from the motor passages 530 into the compressor chamber 528, thereby creating a lower pressure inside the motor 106.

In another embodiment, the motor 106 is outside of the hermetic housing as shown in FIG. 8. The motor 106 is cooled by air, with supplementary cooling means comprising a jacket on the stator outside diameter in which condenser water flows. Even though the motor is outside the hermetic housing, the motor cavity can be maintained at pressure less than atmospheric pressure via ducting fans fastened to the motor shaft. Alternative embodiments may include combinations whereby liquid refrigerant is expanded into the cooling jacket 512 instead of the condenser water; the motor is configured inside the hermetic housing instead of outside the housing; and wherein a reduced pressure is not maintained.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A chiller system comprising:
   a compressor, a condenser and an evaporator connected in a closed refrigerant loop;
   a switched reluctance motor connected to the compressor to power the compressor, the switched reluctance motor including a rotor portion, a stator portion and an air gap between the rotor portion and the stator portion, and the rotor portion including a first end and a second end;
   a variable speed drive electrically connected to the switched reluctance motor, the variable speed drive being configured to receive an input AC power at a fixed input AC voltage and a fixed input frequency and to provide an output power at a variable voltage and variable frequency to the switched reluctance motor;
   a cooling system to cool the motor, the motor cooling system being disposed adjacent the stator portion of the switched reluctance motor; and
   a pair of barrier portions disposed at the first and second ends of the rotor to restrict turbulent fluid flow through the air gap of the switched reluctance motor.

2. The system of claim 1, also including: a hermetic housing, the switched reluctance motor and the compressor being disposed within the housing; and a drive shaft interconnecting the compressor and the switched reluctance motor.

3. The system of claim 2, wherein: the condenser comprises a fluid circuit to exchange heat with refrigerant; and the motor cooling system comprises a jacket portion including at least one conduit for fluid flow therethrough disposed on the stator portion of the switched reluctance motor, the jacket portion being connected and in fluid communication with the condenser fluid circuit to permit circulation of fluid from the condenser fluid circuit through the jacket portion to cool the switched reluctance motor.

4. The system of claim 3, also including a conduit interconnecting a suction chamber of the compressor to the air gap of the switched reluctance motor to reduce the air pressure in the switched reluctance motor relative to atmospheric pressure.

5. The system of claim 2, wherein the motor cooling system comprises a conduit interconnecting the refrigerant loop of the chiller system containing a liquid refrigerant, a jacket portion including at least one conduit for fluid flow therethrough disposed on the switched reluctance motor stator portion, and the jacket portion being connected and in fluid communication with the refrigerant loop, and further including an expansion valve in fluid communication with the refrigerant loop, to vaporize the refrigerant and to circulate the vaporized refrigerant in the jacket portion and in the air gap of the switched reluctance motor.

6. The system of claim 5, also including a conduit interconnecting a suction chamber of the compressor to the air gap of the switched reluctance motor to reduce the air pressure in the switched reluctance motor relative to atmospheric pressure.

7. The system of claim 3, wherein the variable speed drive includes a heat exchanger circuit; and the condenser fluid circuit being interconnected to the heat exchanger circuit of the variable speed drive to permit circulation of condenser fluid through the heat exchanger portion to cool the variable speed drive.

8. The system of claim 7, wherein: the condenser comprises a fluid circuit to exchange heat with refrigerant; and the motor cooling system comprises an intermediate fluid circuit to exchange heat with the condenser fluid circuit, and a jacket portion including at least one conduit for fluid flow therethrough disposed on the stator portion of the switched reluctance motor, the jacket portion being connected and in fluid communication with the intermediate fluid circuit to permit circulation of fluid from the intermediate fluid circuit through the jacket portion to cool the switched reluctance motor.

9. The system of claim 1, wherein the variable speed drive further includes:
   a converter stage connected to an AC power source providing the input AC power, the converter stage being configured to convert the fixed input AC voltage to a boosted DC voltage, the boosted DC voltage being greater than the fixed input AC voltage;
   a DC link connected to the converter stage, the DC link being configured to filter the boosted DC voltage and store energy from the converter stage; and
   an inverter stage connected to the DC link, the inverter stage being configured to convert the boosted DC voltage from the DC link into the output power having the variable voltage and the variable frequency.

10. A chiller system comprising:
   a compressor, a condenser and an evaporator connected in a closed refrigerant loop;
   a switched reluctance motor connected to the compressor, the compressor being disposed within an hermetic housing and having a shaft connected to a coupling means, for coupling the compressor shaft to the switched reluctance motor to power the compressor, the switched reluctance motor including a rotor portion attached to a motor shaft, a stator portion and an air gap between the rotor portion and the stator portion, and the rotor portion including a first end and a second end;
   a variable speed drive electrically connected to the switched reluctance motor, the variable speed drive being configured to receive an input AC power at a fixed input AC voltage and a fixed input frequency and to provide an output power at a variable voltage and variable frequency to the switched reluctance motor;
   a cooling system to cool the motor, the motor cooling system being disposed adjacent the stator portion of the switched reluctance motor; and
   a pair of barrier portions disposed at the first and second ends of the rotor to restrict turbulent fluid flow through the air gap of the switched reluctance motor.

11. The system of claim 10, wherein: the condenser comprises a fluid circuit to exchange heat with refrigerant; and the motor cooling system comprises a jacket portion including at least one conduit for fluid flow therethrough disposed on the stator portion of the switched reluctance motor, the jacket portion being connected and in fluid communication with the condenser fluid circuit to permit circulation of fluid from the condenser fluid circuit through the jacket portion to cool the switched reluctance motor.

12. The system of claim 10, also including a conduit interconnecting a suction chamber of the compressor to the air gap of the switched reluctance motor to reduce the air pressure in the switched reluctance motor relative to atmospheric pressure.

13. The system of claim 11, also including a conduit interconnecting a suction chamber of the compressor to the air gap of the switched reluctance motor to reduce the air pressure in the switched reluctance motor relative to atmospheric pressure.

14. The system of claim 10, wherein the cooling system comprises a conduit interconnecting the refrigerant loop of the chiller system containing a liquid refrigerant, and an expansion valve in fluid communication with the closed refrigerant loop, to vaporize the liquid refrigerant and to circulate vaporized refrigerant in the air gap of the switched reluctance motor.

15. The system of claim 10, wherein the motor cooling system comprises a conduit interconnecting the refrigerant loop of the chiller system containing a liquid refrigerant, a jacket portion including at least one conduit for fluid flow therethrough disposed on the switched reluctance motor stator portion, and the jacket portion being connected and in fluid communication with the refrigerant loop, and further including an expansion valve in fluid communication with the refrigerant loop, to vaporize the refrigerant and to circulate the vaporized refrigerant in the jacket portion and in the air gap of the switched reluctance motor.

16. The system of claim 10, wherein the variable speed drive includes a heat exchanger circuit; and the condenser fluid circuit being interconnected to the heat exchanger circuit of the variable speed drive to permit circulation of condenser fluid through the heat exchanger portion to cool the variable speed drive.

17. The system of claim 15, wherein: the condenser comprises a fluid circuit to exchange heat with refrigerant; and the motor cooling system comprises an intermediate fluid circuit to exchange heat with the condenser fluid circuit, and a jacket portion including at least one conduit for fluid flow therethrough disposed on the stator portion of the switched reluctance motor, the jacket portion being connected and in fluid communication with the intermediate fluid circuit to permit circulation of fluid from the intermediate fluid circuit through the jacket portion to cool the switched reluctance motor.

18. The system of claim 10, wherein the variable speed drive further includes:
  a converter stage connected to an AC power source providing the input AC power, the converter stage being configured to convert the fixed input AC voltage to a boosted DC voltage, the boosted DC voltage being greater than the fixed input AC voltage;
  a DC link connected to the converter stage, the DC link being configured to filter the boosted DC voltage and store energy from the converter stage; and
  an inverter stage connected to the DC link, the inverter stage being configured to convert the boosted DC voltage from the DC link into the output power having the variable voltage and the variable frequency.

19. The system of claim 10, wherein the coupling means is a magnetic coupling.

20. The system of claim 19, wherein the magnetic coupling includes a first hub portion connected to the compressor shaft and a second hub portion attached to the rotor shaft, and a hermetic barrier portion disposed within a gap between the first and second hub portions, the hermetic barrier portion being sealingly attached to an end of the compressor adjacent to the switched reluctance motor, the first and second hub portions being magnetically operable to drive the compressor shaft.

* * * * *